(12) United States Patent
Du Bois

(10) Patent No.: US 11,350,780 B1
(45) Date of Patent: Jun. 7, 2022

(54) SYSTEM, METHOD, AND APPARATUS FOR ACCEPTANCE AND DELIVERY OF FLAT OBJECTS

(71) Applicant: Dean Du Bois, Clearwater, FL (US)

(72) Inventor: Dean Du Bois, Clearwater, FL (US)

( * ) Notice: Subject to any disclaimer, the term of this patent is extended or adjusted under 35 U.S.C. 154(b) by 0 days.

(21) Appl. No.: 17/401,395

(22) Filed: Aug. 13, 2021

(51) Int. Cl.
*A47G 23/08* (2006.01)
*A47J 39/02* (2006.01)
*A47F 10/06* (2006.01)
*B65G 1/07* (2006.01)
*B65G 1/02* (2006.01)

(52) U.S. Cl.
CPC .......... *A47G 23/08* (2013.01); *A47F 10/06* (2013.01); *A47J 39/02* (2013.01); *B65G 1/07* (2013.01); *B65G 1/023* (2013.01)

(58) Field of Classification Search
CPC .......... B65G 1/023; B65G 1/07; A47G 23/08; A47F 10/06; A47J 39/02
USPC ................................. 198/347.1–347.4
See application file for complete search history.

(56) References Cited

U.S. PATENT DOCUMENTS

| | | | | |
|---|---|---|---|---|
| 2,717,085 A * | 9/1955 | Waddington | ............ | B65G 1/07 211/74 |
| 3,033,633 A * | 5/1962 | Holloway | ................ | B65G 1/07 312/306 |
| 3,327,655 A * | 6/1967 | Mackay | ................... | B65G 1/07 108/136 |
| 4,950,120 A * | 8/1990 | Barnes | ................... | B65G 33/06 221/222 |
| 5,064,093 A * | 11/1991 | Davis | ................... | B65G 59/108 221/222 |
| 5,473,978 A * | 12/1995 | Colombo | ............ | B65G 17/123 198/347.1 |
| 6,035,973 A * | 3/2000 | Neal | ........................ | B65G 1/07 187/244 |
| 10,913,603 B1 * | 2/2021 | Kalm | ...................... | B65G 69/24 |
| 2020/0156868 A1 * | 5/2020 | Bidram | .................. | A01G 9/143 |

FOREIGN PATENT DOCUMENTS

| | | | | |
|---|---|---|---|---|
| CN | 107598937 | * | 1/2019 | ............ A47G 23/08 |
| CN | 109849007 | * | 1/2019 | ............ A47G 23/06 |
| FR | 3008671 | * | 1/2013 | ............ B62B 3/065 |
| JP | 2006158649 | * | 6/2006 | ............ A47B 31/00 |

* cited by examiner

*Primary Examiner* — James R Bidwell
(74) *Attorney, Agent, or Firm* — Larson & Larson, P.A.; Frank Liebenow; Justin P. Miller

(57) ABSTRACT

A plate delivery system provides storage for plates in a first-in, last-out configuration. As the kitchen staff completes a meal (plated), the plate holding the meal is presented to the plate delivery system and the plate moves into the plate delivery system to be ready for the next plate. After a number of plates are stored in the plate delivery system, the plate delivery system is transported from the kitchen to the eating area (e.g., restaurant table or banquet table) and each plate is sequentially presented to a delivery mechanism (e.g., a robot or a waitperson) for final delivery to the table. In some embodiments, the plate delivery system is enclosed and has a cover mechanism to prevent food contamination by foreign matter and in some embodiments, the plate delivery system has heating/cooling mechanisms to help keep warm food warm or cool food cool.

19 Claims, 19 Drawing Sheets

SYSTEM, METHOD, AND APPARATUS FOR ACCEPTANCE AND DELIVERY OF FLAT OBJECTS

FIELD

This invention relates to the field of robotics and more particularly to a system for storing and retrieving flat objects such as plates, and more particularly, plates having thereon food.

BACKGROUND

As automation progresses, the delivery and placement of plates on tables will eventually be automated, providing fast distribution of plated items (e.g., food that is still hot or cold) to customers of restaurants, banquet halls, wedding receptions, and the like.

Today, the plated food distribution process is predominately manual. The kitchen staff prepare the food and distribute the food onto several plates. For a restaurant, often, the plates are placed on a tray and delivered to an individual table of customers. For a banquet or reception, often the plates are placed into a plate cabinet on wheels, each plate placed onto an individual shelf until the cabinet is full, and the cabinet is wheeled out to a location near the customers and then each plate is manually retrieved from the cabinet and delivered to each customer, one or a few at a time. To keep food warm, often a plastic or metal cover is placed over each plate.

Recent developments have provided a robotic delivery system in which a robot will place each plate at the tables, but there are issues regarding a robotic device retrieving plates. For one, it is difficult to construct a robot that is capable of bending down or reaching up to retrieve plates from the lower or upper shelves of a cabinet. For robotic retrieval, it is preferred that the plates be retrieved from a height that is similar to table height so that the robot does not need to be designed with an elevator or bending mechanism. Second, keeping food at the proper serving temperature often requires individual plate covers and it is often difficult to design a robot capable of holding a plate while removing the cover.

Therefore, there is a need for a mechanism that will capture plates from the kitchen staff (e.g., plates having food thereon), store the plates, and present the plates sequentially to a robot for delivery to customers of restaurants and banquet halls. It is desired that the mechanism presents the plates at a height that is compatible with the robot and that the plates are maintained in a proper orientation so that the robot need not have to rotate the plate during the serving operation. It is also desirable that the plates (and food) be kept in a sealed environment until presented to the robot to keep foreign matter away from the food and, in some cases, it is desirable to provide temperature control to the plates/food, keeping warm food warm or cool food cool.

What is needed is a system that will sequentially deliver plates to a robot at a location near customers of a restaurant or banquet hall.

SUMMARY

The plate delivery system provides storage for plates in a first-in, last-out configuration. As the kitchen staff completes a meal (plated), the plate holding the meal is presented to the plate delivery system and the plate moves into the plate delivery system to be ready for the next plate. After a number of plates are stored in the plate delivery system, the plate delivery system is transported from the kitchen to the eating area (e.g., restaurant table or banquet table) and each plate is sequentially presented to a delivery mechanism or person (e.g., a robot or a waitperson) for final delivery to the table. In some embodiments, the plate delivery system is enclosed and has a cover mechanism to prevent food contamination by foreign matter and in some embodiments, the plate delivery system has heating/cooling mechanisms to help keep warm food warm or cool food cool.

In one embodiment, a system is disclosed including a mechanism for acceptance and delivery of flat objects (e.g., plates having food thereon). In such, a system for acceptance and delivery of plates includes a staging area into which the plate is accepted or delivered and a mechanism is configured to move the plate into and out of the staging area by a distance defined by a height of the plate and contents of the plate (e.g., the food).

In another embodiment, a method of accepting and delivering plates from/to a staging area is disclosed including when accepting the plate, placing the plate in the staging area and operating a mechanism to move the plate from the staging area into a storage position. When delivering the plate, operating the mechanism in reverse to move the plate from the storage position to the staging area for removal from the staging area.

In another embodiment, a system for acceptance and delivery of plates is disclosed including a staging area into which the plate is accepted or delivered and a plurality of spirals. The plurality of spirals interfaced to a motor and the spirals spaced to interface with an outer edge of the plate. The motor rotating the spirals in one set of directions to move the plate into the staging area for delivery and the motor rotating the spirals in a second set of directions to move the plate from the staging area for acceptance of the plate. The plate is moved by the rotation of the spirals into and out of the staging area by a distance defined by a height of the plate and contents of the plate.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
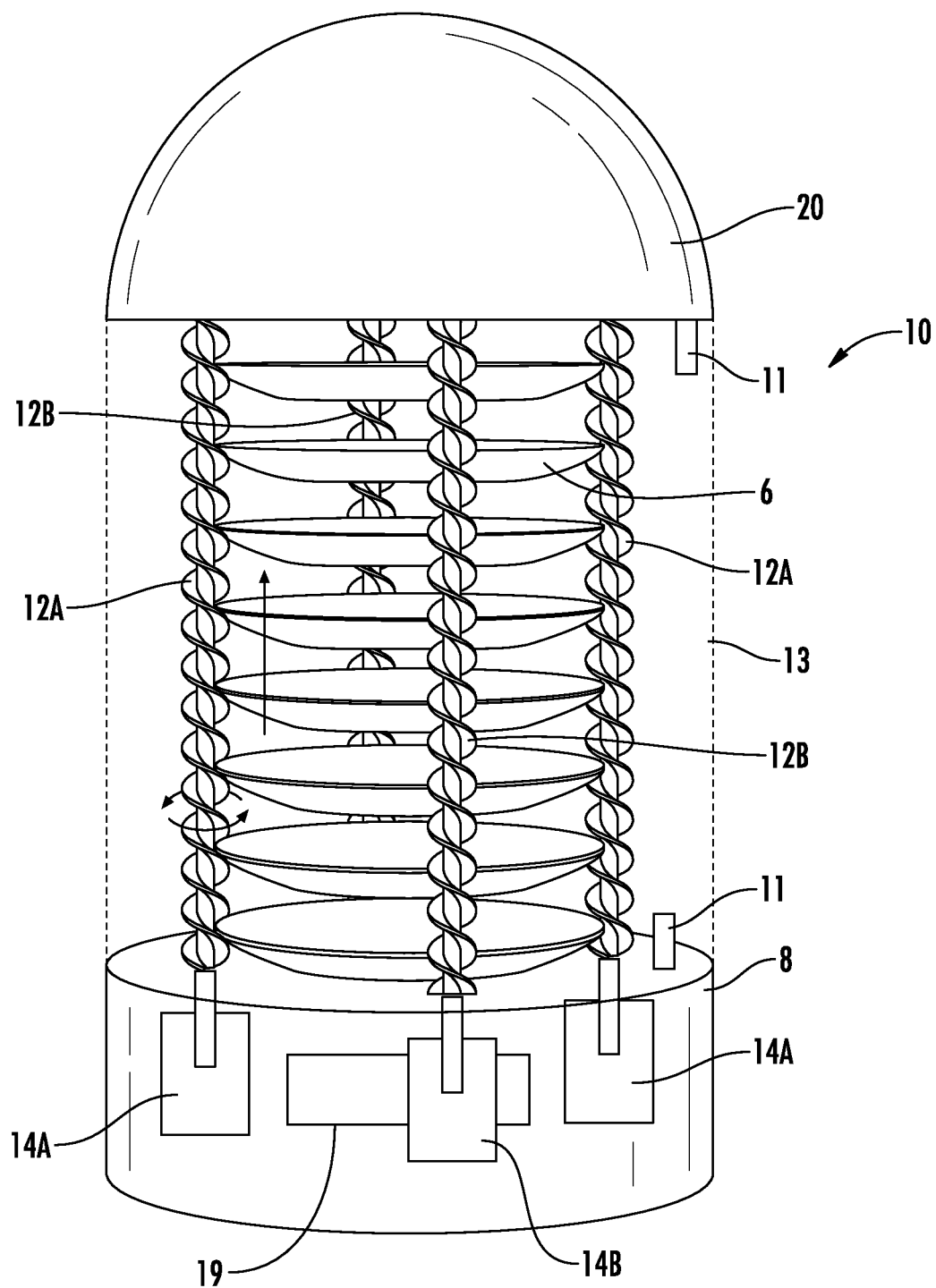
FIG. 1 illustrates a schematic view of a mechanism for acceptance and delivery of plates (e.g., plates having food thereon).

Reference will now be made in detail to the presently preferred embodiments of the invention, examples of which are illustrated in the accompanying drawings. Throughout the following detailed description, the same reference numerals refer to the same elements in all figures.

Throughout this document, the term "plate" is used as a generic term for an object having a surface for holding food and, such is used as an example of such objects as it is well known to hold food in/on bowls or other similar shaped objects. Note that although the exemplary plates are shown as disc-shaped, other shapes are equally anticipated such as hexagonal or square plates.

Referring to FIG. 1, a first embodiment of the delivery mechanism 10 for acceptance and delivery of plates 6 (e.g., plates having food thereon) is shown. In this embodiment, a plurality of spiral shafts 12A/12B are spaced to hold plates 6 therebetween and are configured to turn by way of one or more motors 14A/14B. As the spiral shafts 12A/12B turn, any plates positioned between the spiral shafts 12A/12B traverse the spirals, moving up or down depending upon a direction of rotation of the spiral shafts 12A/12B. Although any number of spiral shafts 12A/12B are anticipated, the embodiment of FIG. 1 shows four spiral shafts 12A/12B. In some embodiments, a first subset of the spiral shafts 12A/12B rotate in one direction (first rotational spiral shafts 12A/12B) and a second subset of the spiral shafts 12A/12B rotate in the opposing direction (second rotational spiral shafts 12A/12B). In such embodiments, counteracting frictional forces between the spiral shafts 12A/12B and the plates 6 help keep the plates 6 position in the same orientation as when the plates 6 were introduced into the delivery mechanism 10 for acceptance and delivery of plates 6.

As many plates 6 have a desired placement orientation (e.g., main entrée closest to the patron, vegetables further away), it is sometimes preferred that the kitchen staff load the plates 6 in a certain direction so that when each plate 6 is presented to the robot 90 (see FIGS. 4A-4D), the plate 6 is in the correct orientation for placement on the table. If all of the spiral shafts 12A/12B rotate in one direction, friction between the spirals will cause the plates 6 to change orientation as they are lowered or raised, possibly requiring reorientation by the robot 90. Therefore, in some embodiments, a first subset of the spiral shafts 12A/12B rotate in one direction (first rotational spiral shafts 12A) and a second subset of the spiral shafts 12A/12B rotate in the opposing direction (second rotational spiral shafts 12B) applying somewhat equal frictional rotational force in opposing directions to prevent rotation of the plates 6.

In some embodiments, each spiral shaft 12A/12B has a dedicated motor 14A/14B (e.g., a servo motor or similar) while in some embodiments, a single motor 14A is rotationally coupled to all of the spiral shafts 12A/12B through gears, pulleys, belts, serpentine belts, or any known rotational coupling mechanism. It is also known that such rotational coupling mechanism is fully capable of providing one direction of rotation to the first rotational shafts 12A and an opposite direction of rotation to the second rotational shafts 12B. There is no requirement that the spiral shafts 12A/12B that are located opposite each other rotate in the same direction. For example, in some embodiments, a first two spiral shafts 12A are adjacent to each other and a second two spiral shafts 12B are adjacent to each other and opposite to the first two spiral shafts 12A. More than four spiral shafts 12A/12B are also anticipated.

Figure 15:
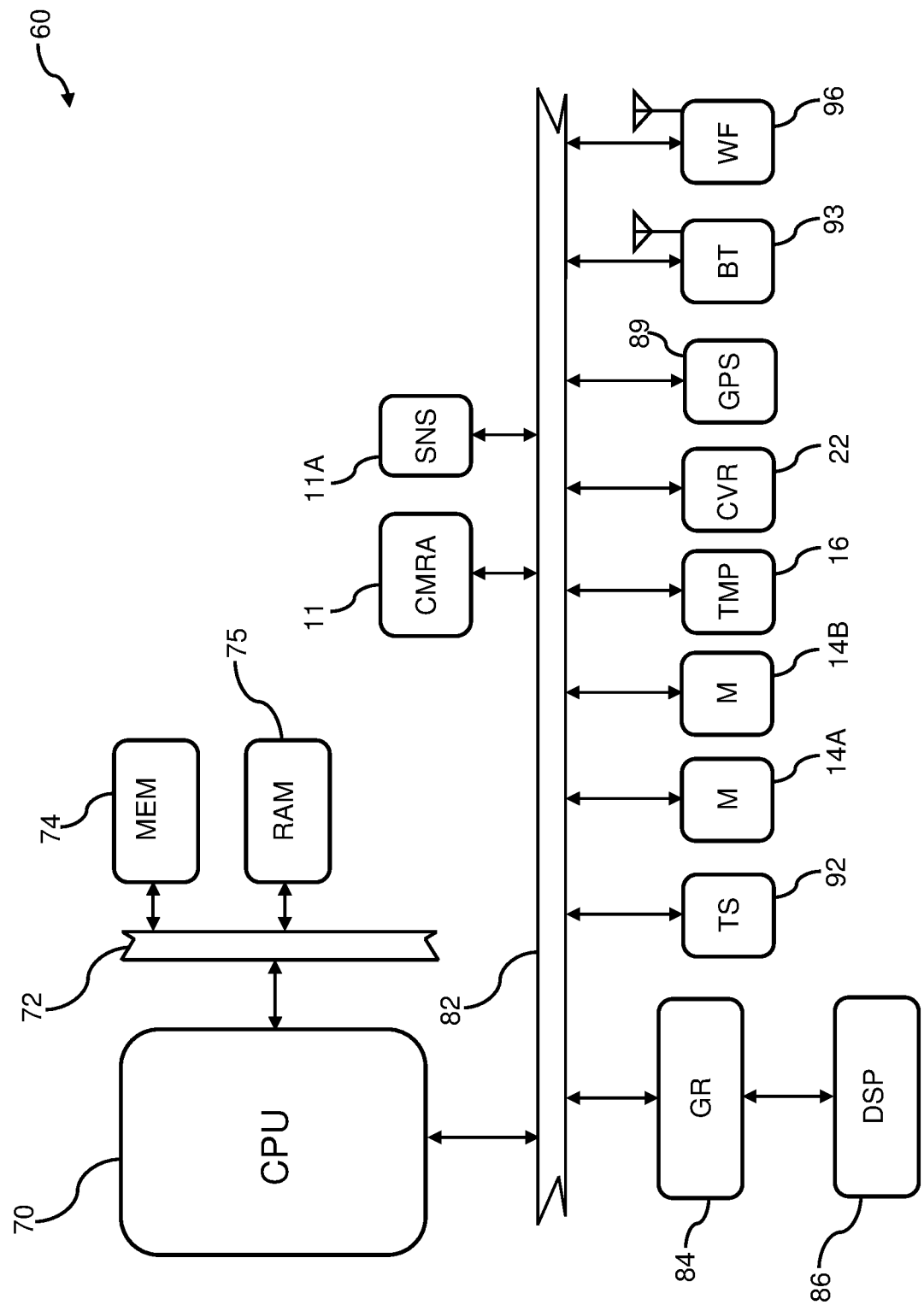
FIG. 15 illustrates a schematic view of a control system for the mechanism for acceptance and delivery of plates.

In some embodiments, rotation of the rotational shafts 12A/12B is controlled by a processor 70 (see FIG. 15). In such, the processor 70 receives a signal to accept a plate 6 and initiates rotation of the rotational shafts 12A/12B in a first direction (or set of directions) to move the plate 6 into the delivery mechanism 10, e.g., by providing power to one or more motors 14A/14B. The plate 6 is then placed into the staging area (upper most position), for example, by kitchen staff.

Later, when the processor receives a signal to present a plate 6, the top plate 6 is removed then the processor initiates rotation of the rotational shafts 12A/12B in an opposite direction (or set of directions), e.g., by providing an opposite polarity power to one or more motors 14A/14B. This moves the plate 6 to the plate staging area (top position) for removal by the robot 90 (or by a person). In some embodiments, the processor is programmed with an inter-plate spacing (e.g., depending upon the height of the plate plus the maximum height of the food resting on the plates 6) and the processor rotates the directional shafts 12A/12B a number of turns that will move each plate by that inter-plate spacing. In some embodiments, sensors 11 are provided and the processor 70 reads and interprets data from the sensors 11 to determine positions and travel of the plates 6, knowing how far to move the plates 6 depending upon the height of the plate 6 just added or the proximity of the next plate 6 to the staging area (top position). Examples of such sensors 11 include cameras, photodetectors, and/or ultrasonic devices that use reflected ultrasonic sound to determine position and location of each plate 6.

Note that although a processor 70 is shown in the above examples, it is known in the industry to implement some or all of this functionality in logic instead of using a processor.

In some embodiments, the delivery mechanism 10 is enclosed in an enclosure 13 and has a cover 20 that protects food from contamination until the food reaches its destination (e.g., the table area). In the embodiment shown in FIG. 1, the cover 20 is multipart 24A/246/24D as in FIG. 2 and opens by way of a cover motor 22 controlled by the processor 70 or by a dedicated switch. In some embodiments, the cover 20 is opened/closed manually.

In some embodiments, again, the delivery mechanism 10 is enclosed in an enclosure 13 and includes a heater/chiller 19. The heater/chiller 19 heats or cools the area within the enclosure 13 depending upon whether the food on the plates 6 is warm food (e.g., a hot entrée) or cool food (e.g., a cold food like ice cream). The heater/chiller 19 is either independently settable by, for example, a temperature setting or controlled by the processor 70.

Although the delivery mechanism 10 is shown loading plates 6 in a downward direction from the plate staging area (top location), it is also anticipated to load plates 6 in an upward direction (e.g., loading the plates 6 into an area above the plate staging area) or both (e.g., alternately loading the plates 6 in an area above then an area below the plate staging area).

Although not shown, any of the delivery mechanism 10 embodiments are anticipated to be mounted on three or more wheels and, in some embodiments, the wheels are motor driven under control of the processor 70 to move the delivery mechanism 10 (e.g., from the kitchen to the dining area and back). In such, it is also anticipated that a positioning system be interfaced to the processor 70 (e.g., a global position satellite receiver) so that the processor 70 is aware of the location of the delivery mechanism 10.

Figure 2A:
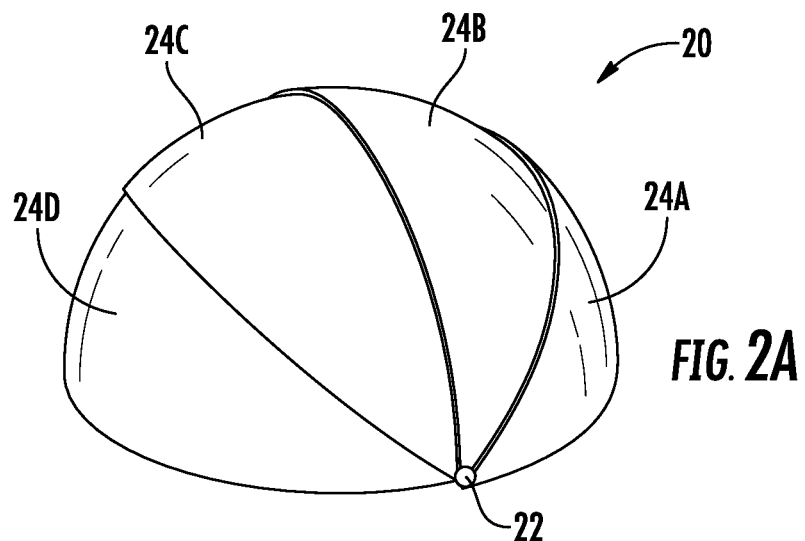
FIGS. 2A, 2B, and 2C illustrate perspective views of the multipart cover of the mechanism for acceptance and delivery of plates.
Figure 2B:
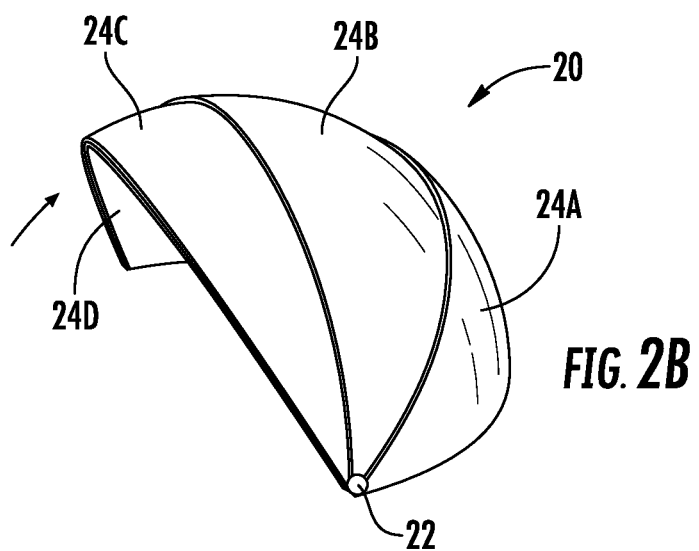
Figure 2C:
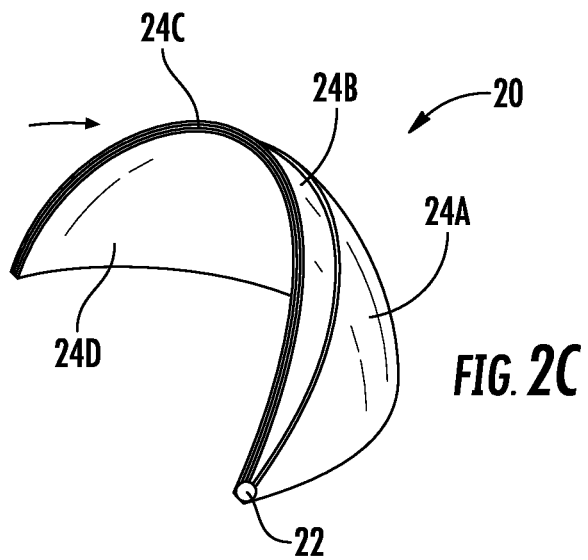

FIGS. 2A, 2B, and 2C illustrate perspective views of an exemplary cover system 20 the delivery mechanism 10 for acceptance and delivery of plates 6 is shown. In some embodiments in which the delivery mechanism 10 is enclosed in an enclosure 13, a cover 20 is provided to protect food from contamination until the food reaches its destination (e.g., the table area). In the exemplary embodiment shown in FIG. 2, the cover 20 is multipart 24A/246/24D and opens by way of a cover motor 22 controlled by the processor 70 or by a dedicated switch. In some embodiments, the cover 20 is opened/closed manually. FIG. 2A shows the cover 20 in the closed position, FIG. 2B shows the cover 20 partially open, and FIG. 2C shows the cover 20 open, allowing plates 6 to be placed/removed into/from the staging area.

Figure 3:
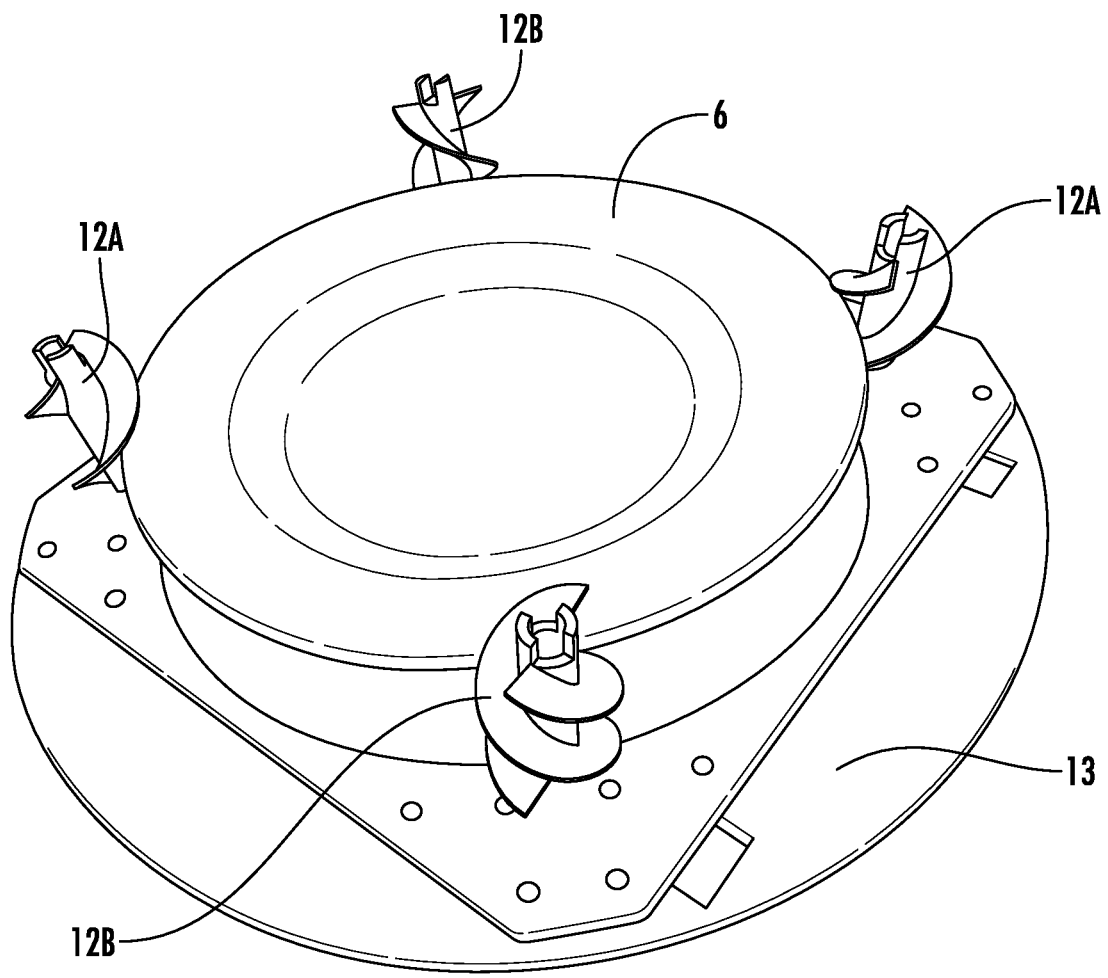
FIG. 3 illustrates a perspective view of the flat object delivery mechanism of the mechanism for acceptance and delivery of plates of FIG. 1.

Referring to FIG. 3, a perspective view of the delivery mechanism 10 for acceptance and delivery of plates 6 of FIG. 1. In this example, it is shown how two spiral shafts 12A spiral in one direction of spiraling and the other two spiral shafts 12B spiral in the opposite direction of spiraling to reduce plate rotation during turning. Note that there is no requirement that the two spiral shafts 12A be on opposite sides of the plate 6, as it is possible that the two spiral shafts 12A be next to each other and the other two spiral shafts 12B also be next to each other.

Figure 4A:
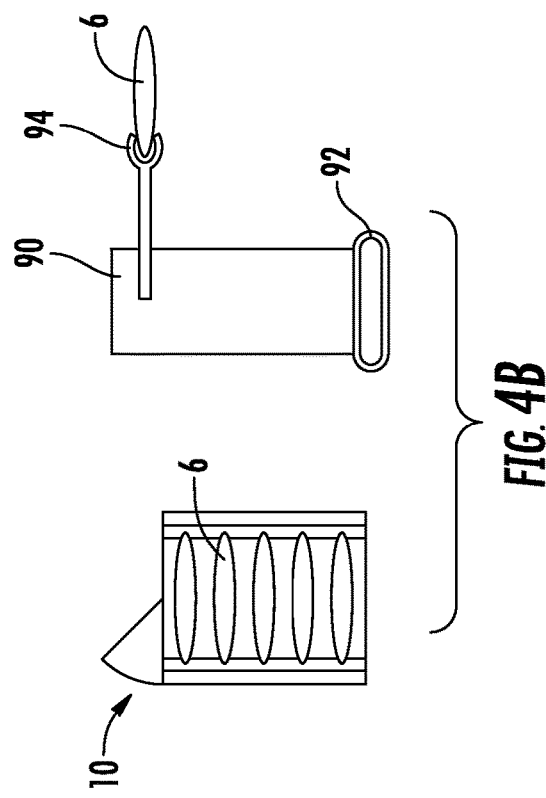
FIGS. 4A, 4B, 4C, and 4D illustrate plan views of the mechanism for acceptance and delivery of plates.
Figure 4B:
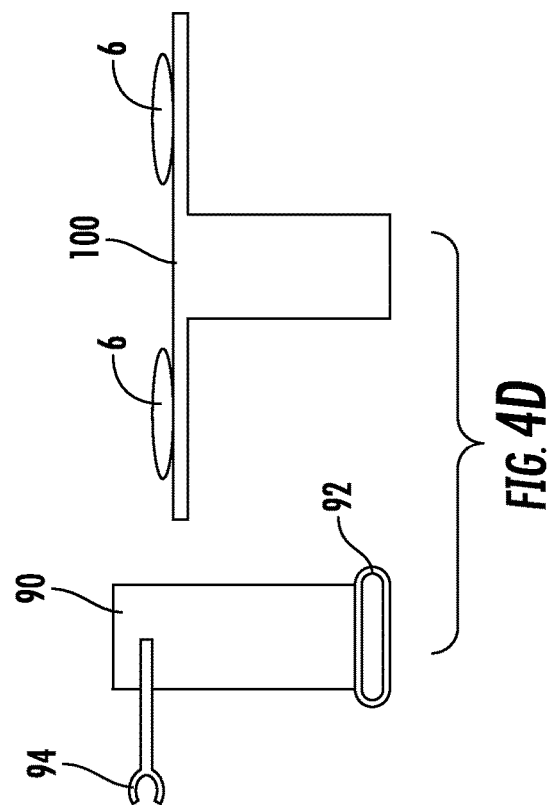

Referring to FIGS. 4A, 4B, 4C, and 4D, plan views of the delivery mechanism 10 in use by a robot 90 are shown. In FIG. 4A, the robot 90 approaches the delivery mechanism 10 and a grip mechanism 94 of the robot 90 removes a top plate 6 as shown in FIG. 4B. Note that in FIG. 4B, the next plate 6 has not yet been moved up to the staging area.

Figure 4C:
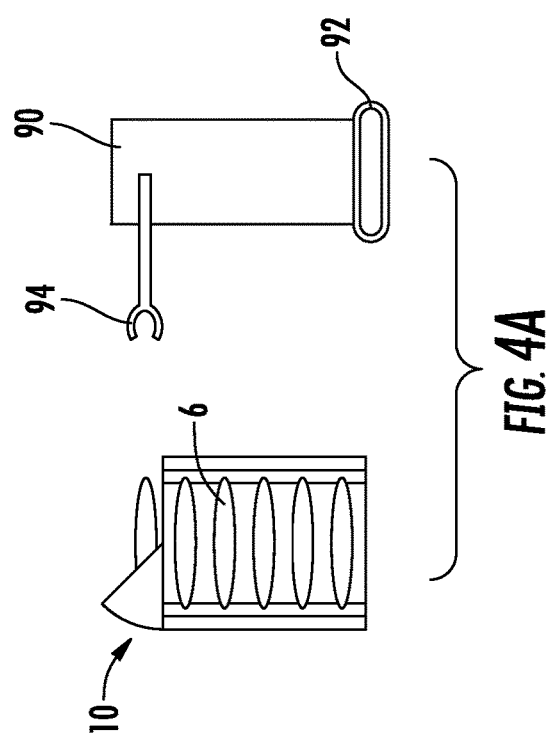
Figure 4D:
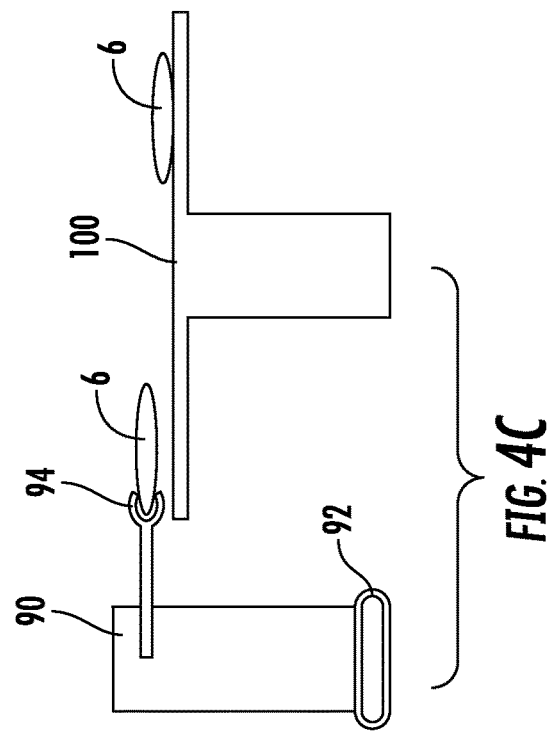

In FIG. 4C, the robot 90 moves to a placement area of a delivery surface 100 (e.g., a table, counter, or any target surface) by way of a robot motion device 92 (e.g., motorized wheels, treads, etc.), and leaves the plate 6 on the table as shown in FIG. 4D. The robot 90 then moves back to retrieve the next plate 6.

Figure 5:
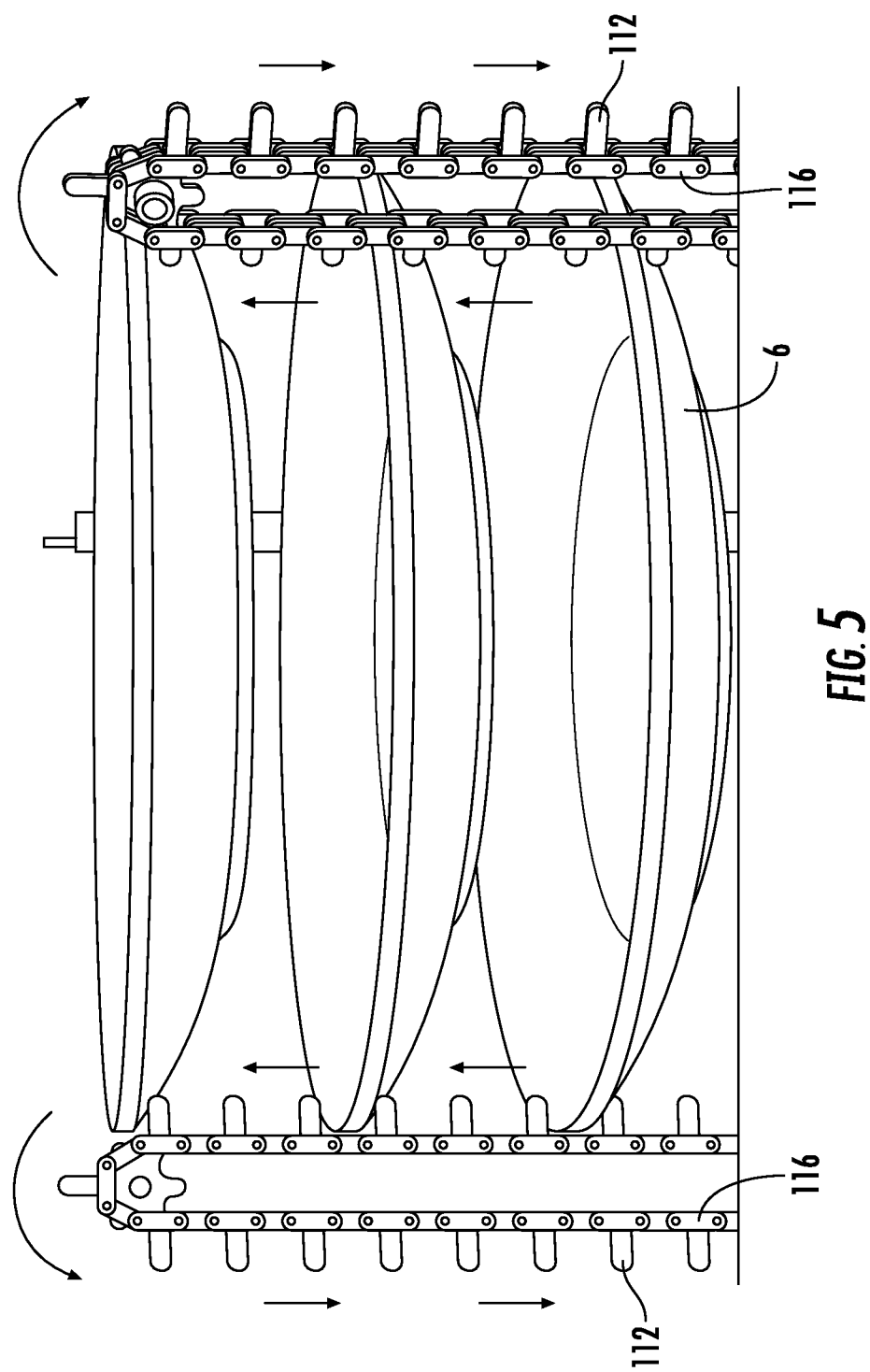
FIG. 5 illustrates a schematic view of an alternate mechanism for acceptance and delivery of plates (e.g., plates having food thereon).

Referring to FIG. 5, a schematic view of an alternate plate delivery mechanism for acceptance and delivery of flat objects (e.g., plates having food thereon) is shown. In this mechanism, a plurality of chains 116 having teeth 112 on which the plates rest provides for the movement of the plates to/from the staging area. The chain 116 is driven by a sprocket turning in one direction to raise and deliver the plates 6 and turning in an opposing direction to lower and accept the plates 6. Note as with all embodiments, it is anticipated that plates be loaded from the top of the plate delivery mechanism (as shown), from the bottom of the plate delivery mechanism, or both if there is an upper and a lower plate delivery mechanism.

Figure 6:
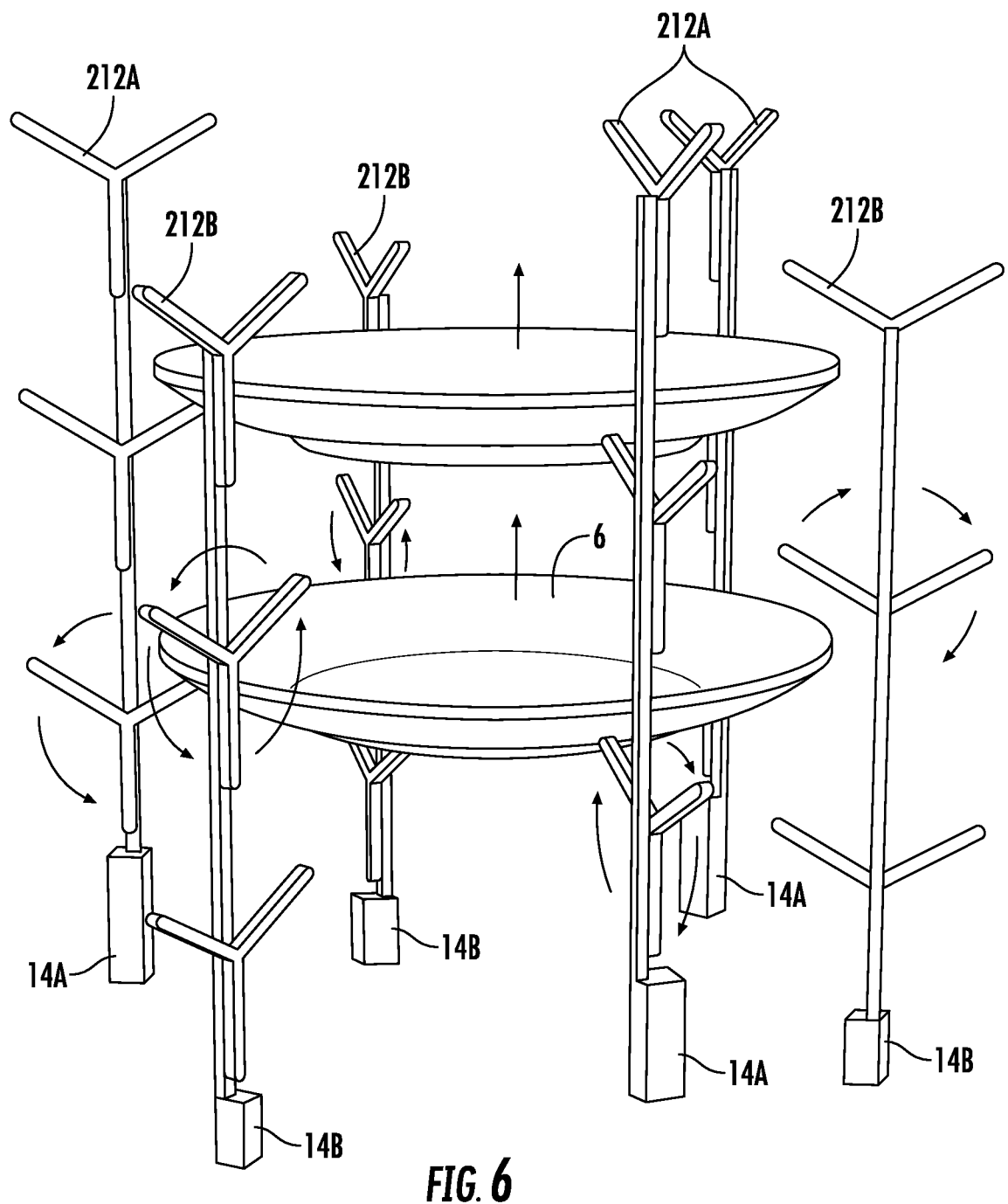
FIG. 6 illustrates a schematic view of an alternate mechanism for acceptance and delivery of plates (e.g., plates having food thereon).

Referring to FIG. 6, a schematic view of an alternate plate delivery mechanism for acceptance and delivery of flat objects (e.g., plates having food thereon) is shown. In this mechanism, a plurality of propellers 212A/212B rotate as controlled by motors 14A14B. The plates rest on the propellers 212A/212B and are dropped down or lifted up to the next set of propellers 212A/212B by rotation of the propeller 212A/212B on which the plate 6 currently rests. The propellers 212A/212B are rotated in one direction to raise and deliver the plates 6 and the propellers 212A/212B are rotated in an opposing direction to lower and accept the plates 6.

Note as with all embodiments, it is anticipated that plates be loaded from the top of the plate delivery mechanism (as shown), from the bottom of the plate delivery mechanism, or both if there is an upper and a lower plate delivery mechanism.

Figure 7:
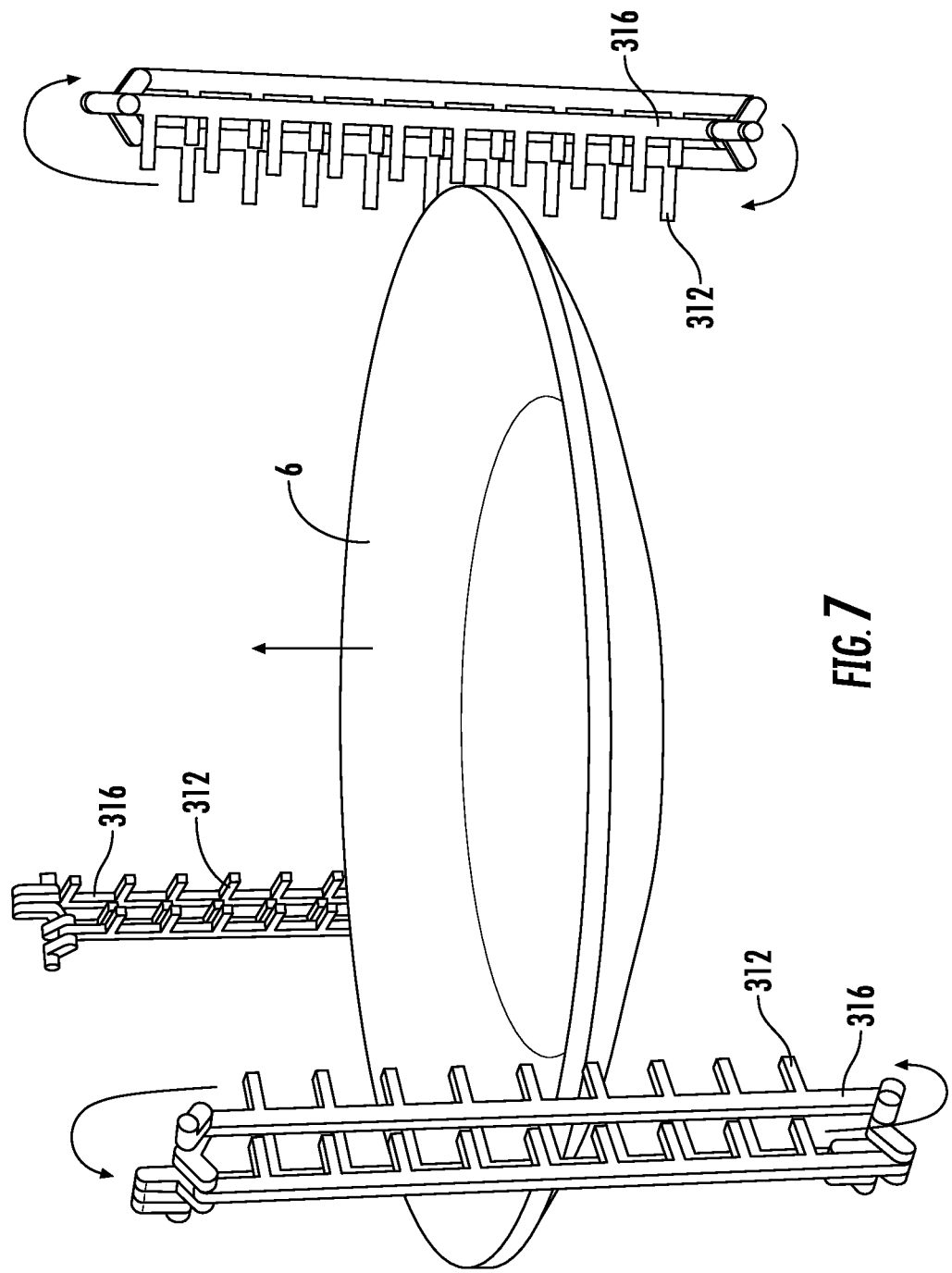
FIG. 7 illustrates a schematic view of an alternate mechanism for acceptance and delivery of plates (e.g., plates having food thereon).

Referring to FIG. 7, a schematic view of another alternate plate delivery mechanism for acceptance and delivery of flat objects (e.g., plates having food thereon) is shown. In this mechanism, a plurality of elongated shafts 316 have teeth 312 on which the plates 6 rest. The plates rest on the teeth 312 and are moved up/down by alternate lifting/lowering of adjacent elongated shafts 316.

Figure 8:
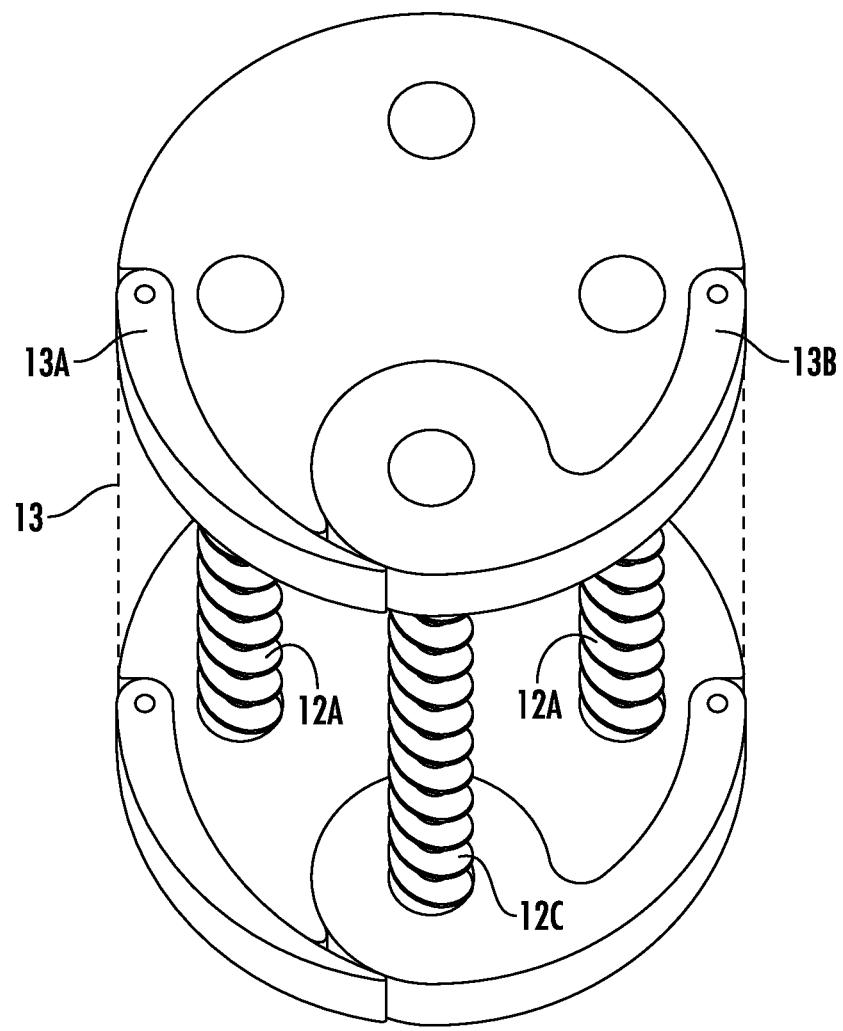
FIGS. 8 and 9 illustrate perspective views of an alternate mechanism for out-of-order acceptance and delivery of plates (e.g., plates having food thereon).
Figure 9:
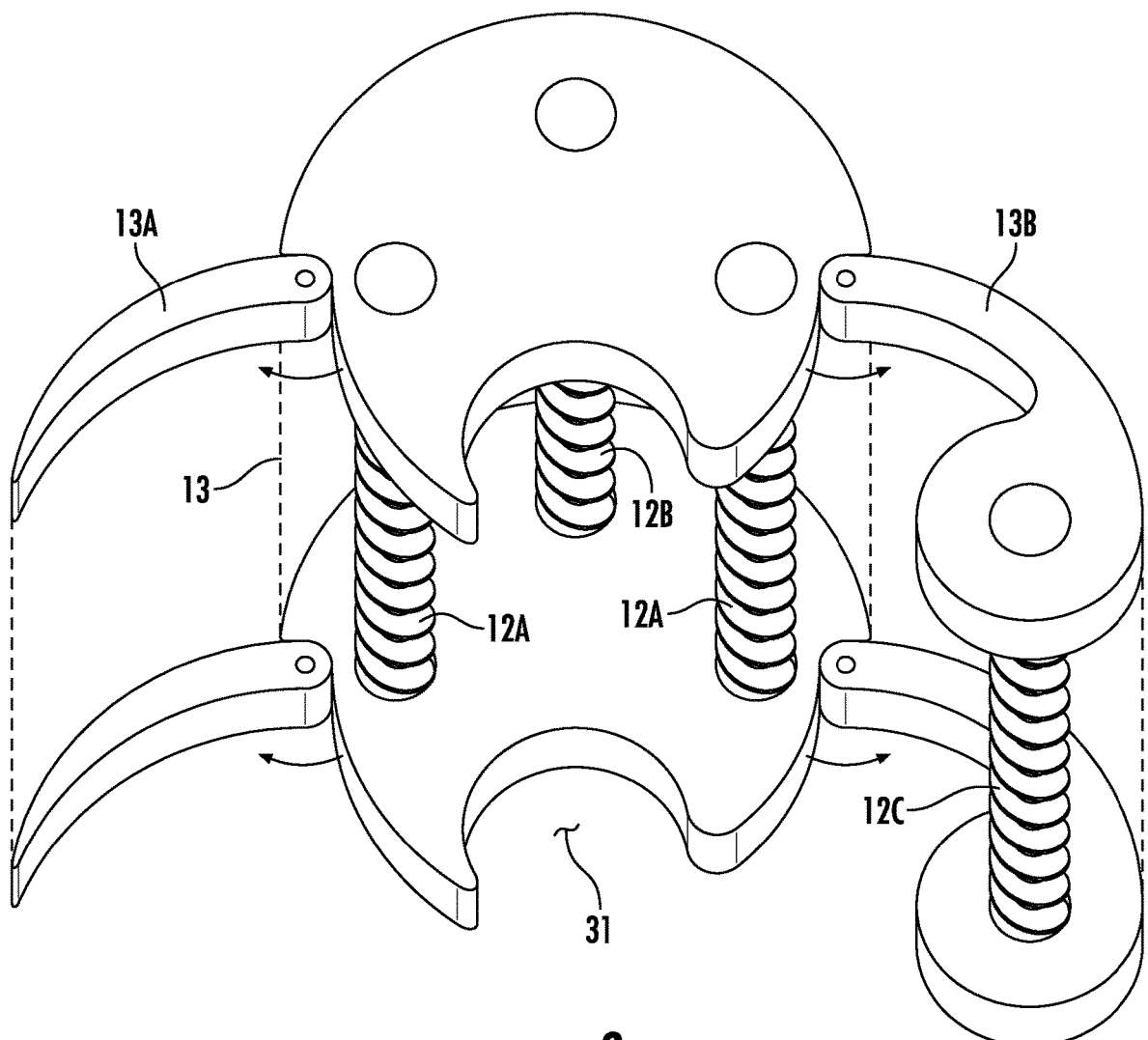

Referring to FIGS. 8 and 9, perspective views of a plate delivery mechanism 10 with out-of-order acceptance and delivery of plates 6 (e.g., plates having food thereon) are shown.

In some applications of the plate delivery mechanism 10, there exists a need to accept the plates 6 in a random order, for example, when each patron is able to select a meal from a menu (e.g., chicken, beef, or fish). In such, it is possible that one type of meal is ready to be plated before another type of meal. To accommodate such, the plate delivery mechanism 10 with out-of-order acceptance and delivery of plates 6 has a door mechanism 13A/13B that hingedly opens. In this example, a captured spiral shafts 12C is integrated into one door of the door mechanism 13A/13B such that, as shown in FIG. 9, when the door mechanism 13A/13B is in the open configuration, the captured spiral shaft 12C moves away from the plate holding area. Any plates that are held between the spiral shafts 12A/126/12C remain in place when the captured spiral shaft 12C swings out with the door mechanism 13A/13B by virtue of the points of contact with the spiral shafts 12A/12B. When the door mechanism 13A/13B is in the open configuration, plates 6 (not shown in FIGS. 8 and 9 for clarity reasons) are able to be removed or inserted into the spiral shafts 12A/12B in any relative position (e.g., placing a fish entrée in a top position and a beef entrée in a next position, etc.). After random placement of plates 6 in the plate delivery mechanism 10 with out-of-order acceptance and delivery, the door mechanism 13A/13B is moved to the closed position (as shown in FIG. 8) and the plate delivery mechanism 10 with out-of-order acceptance and delivery is relocated for delivery to the delivery surface 100. Note that it is anticipated that once near the delivery surface 100, the plates 6 be delivered either at the staging area or randomly by opening the door mechanism 13A/13B.

Referring to FIGS. 10, 11, 12, and 13, perspective views of an integrated delivery mechanism 10A for acceptance and delivery of plates 6 (e.g., plates having food thereon) having a delivery mechanism 120 for placement of the plates 6 on a surface 100 are shown. In this embodiment, instead of requiring a separate delivery person or robot 90, the integrated delivery mechanism 10A for acceptance and delivery of plates 6 (e.g., plates having food thereon) has delivery arms 124 for transporting the plates 6 from the staging area to the surface 100. In the embodiments shown in FIGS. 10, 11, 12, and 13, the delivery arms 124 have fingers 126 for holding the plate 6 that is to be delivered from the staging area to the surface 100. A first movement mechanism 122A (e.g., servo motors, hydraulic rams, screw drives) extends/retracts the arms 124 (e.g., telescoping). A second movement mechanism 122B (e.g., servo motors, hydraulic rams, screw drives) rotates the delivery arms 124 to engage/disengage the fingers 126.

Figure 10:
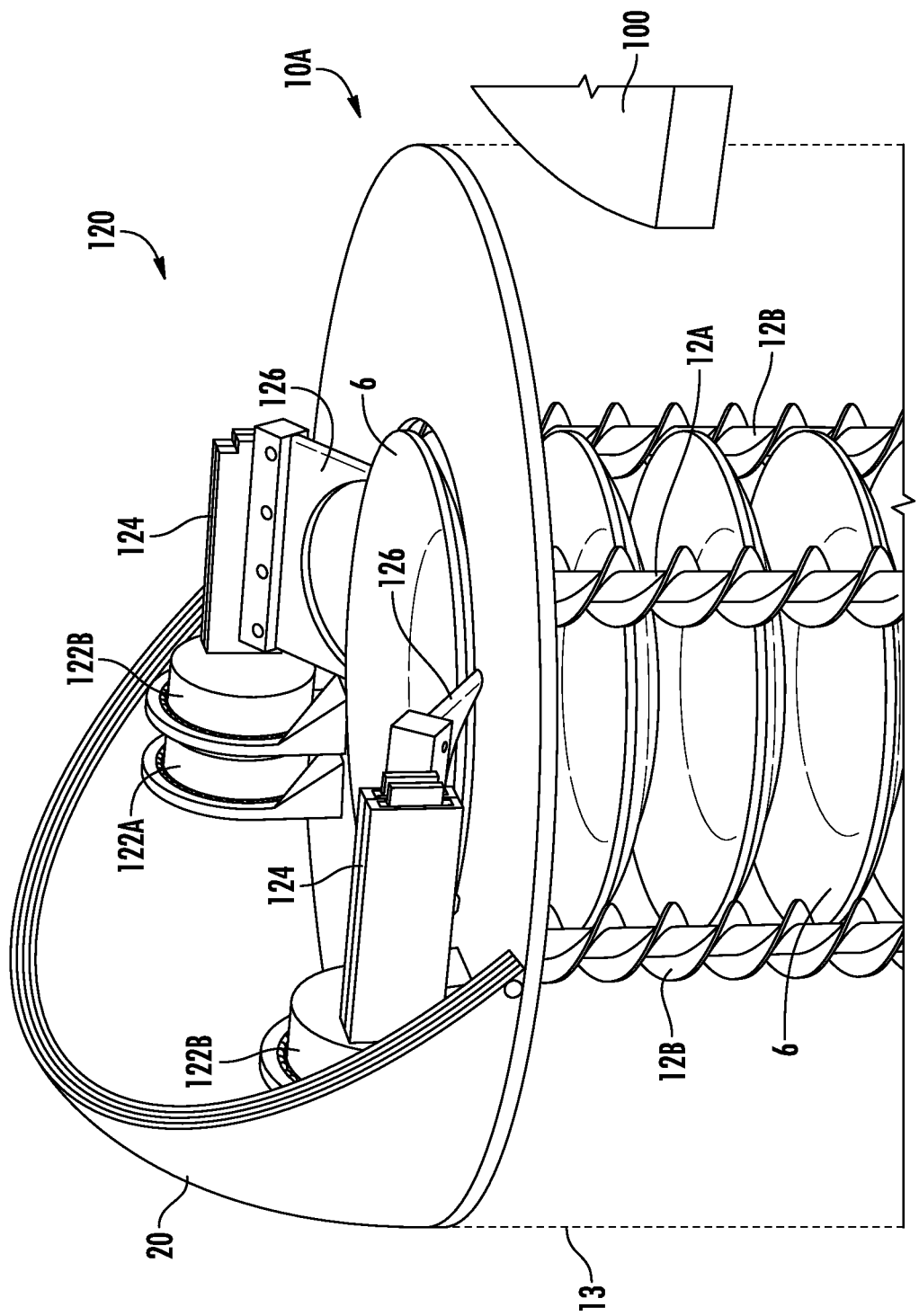
FIGS. 10, 11, 12, and 13 illustrate perspective views of an alternate mechanism for acceptance and delivery of plates (e.g., plates having food thereon) having an extending arm for placement of the plates on a surface.
Figure 11:
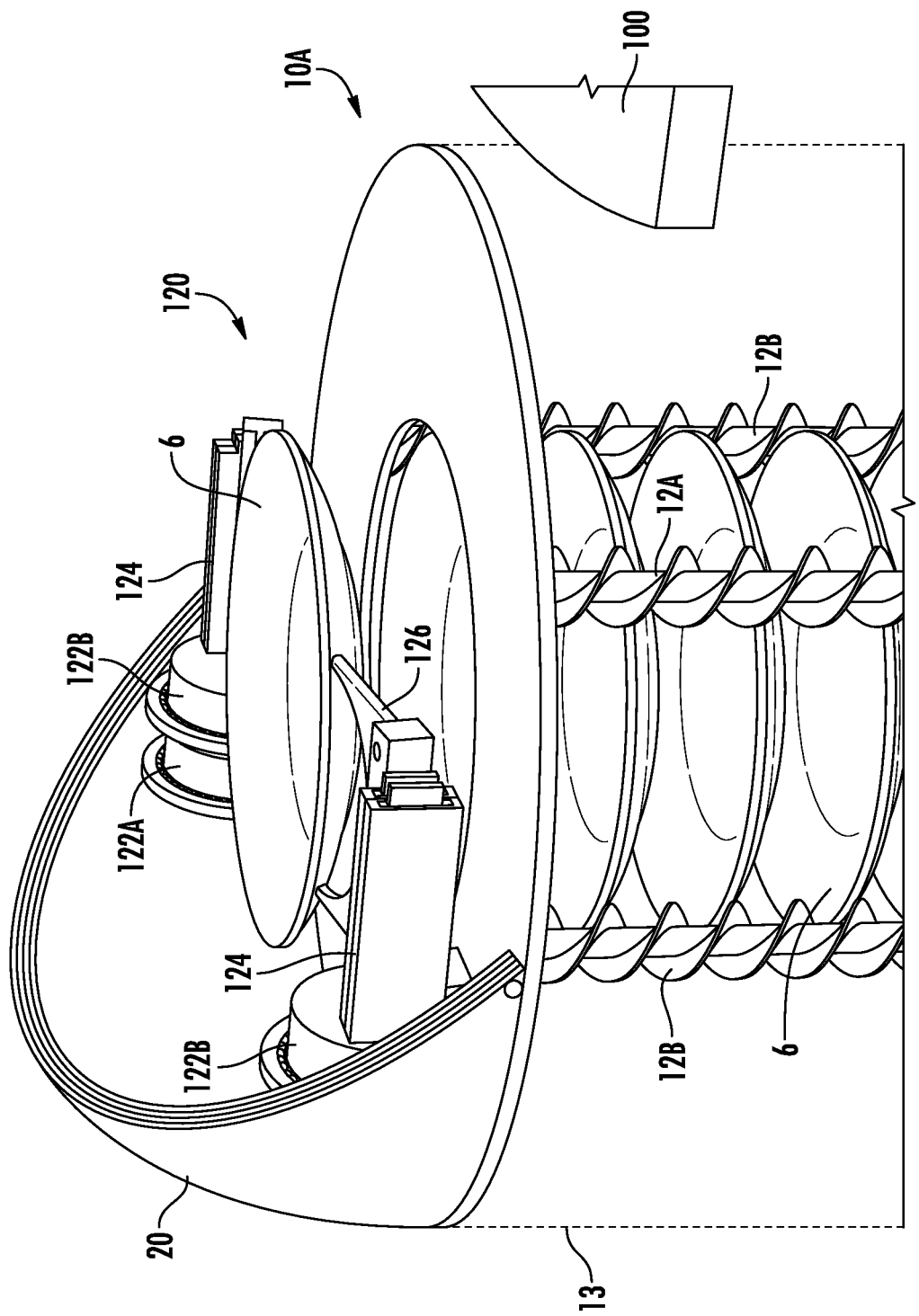
Figure 12:
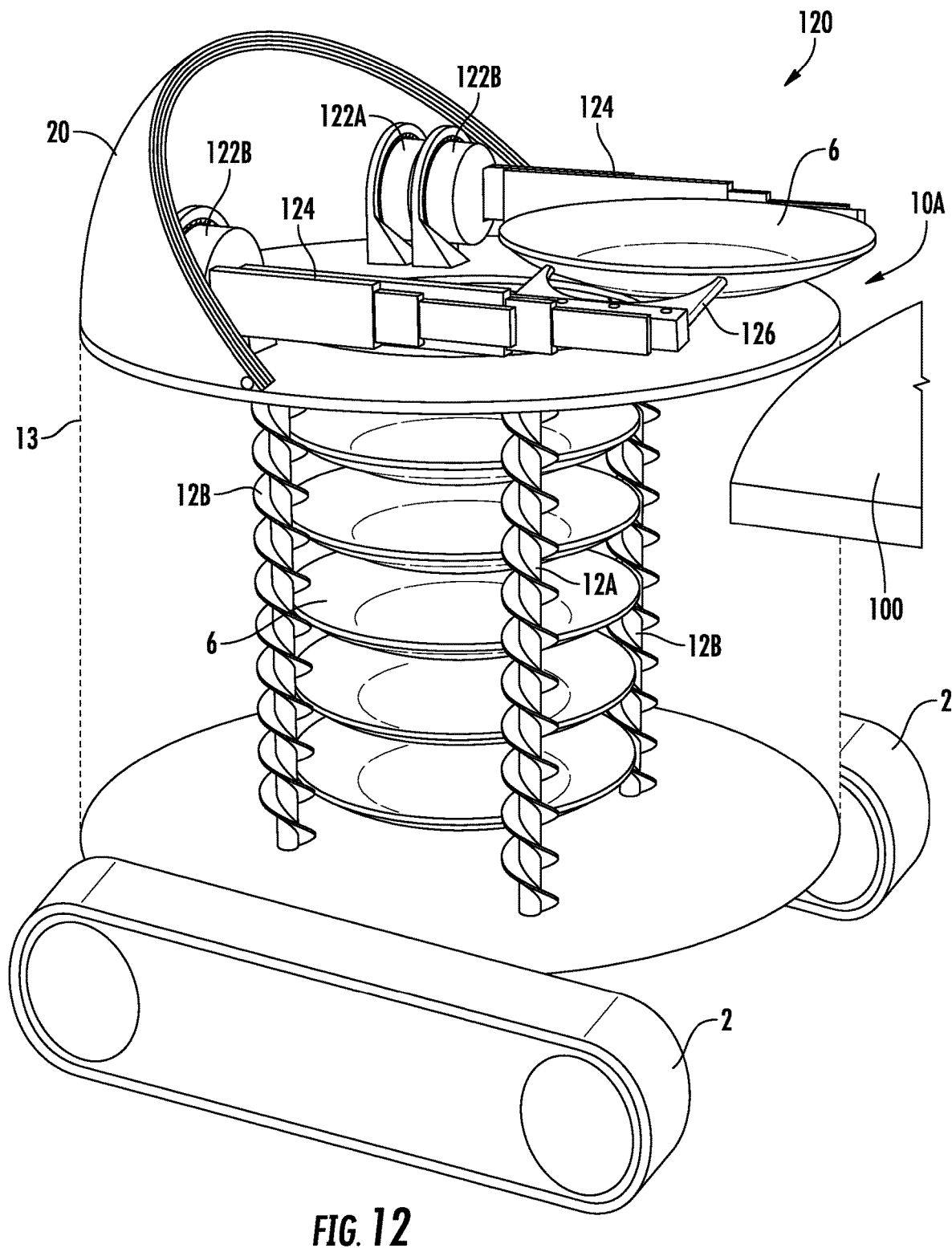
Figure 13:
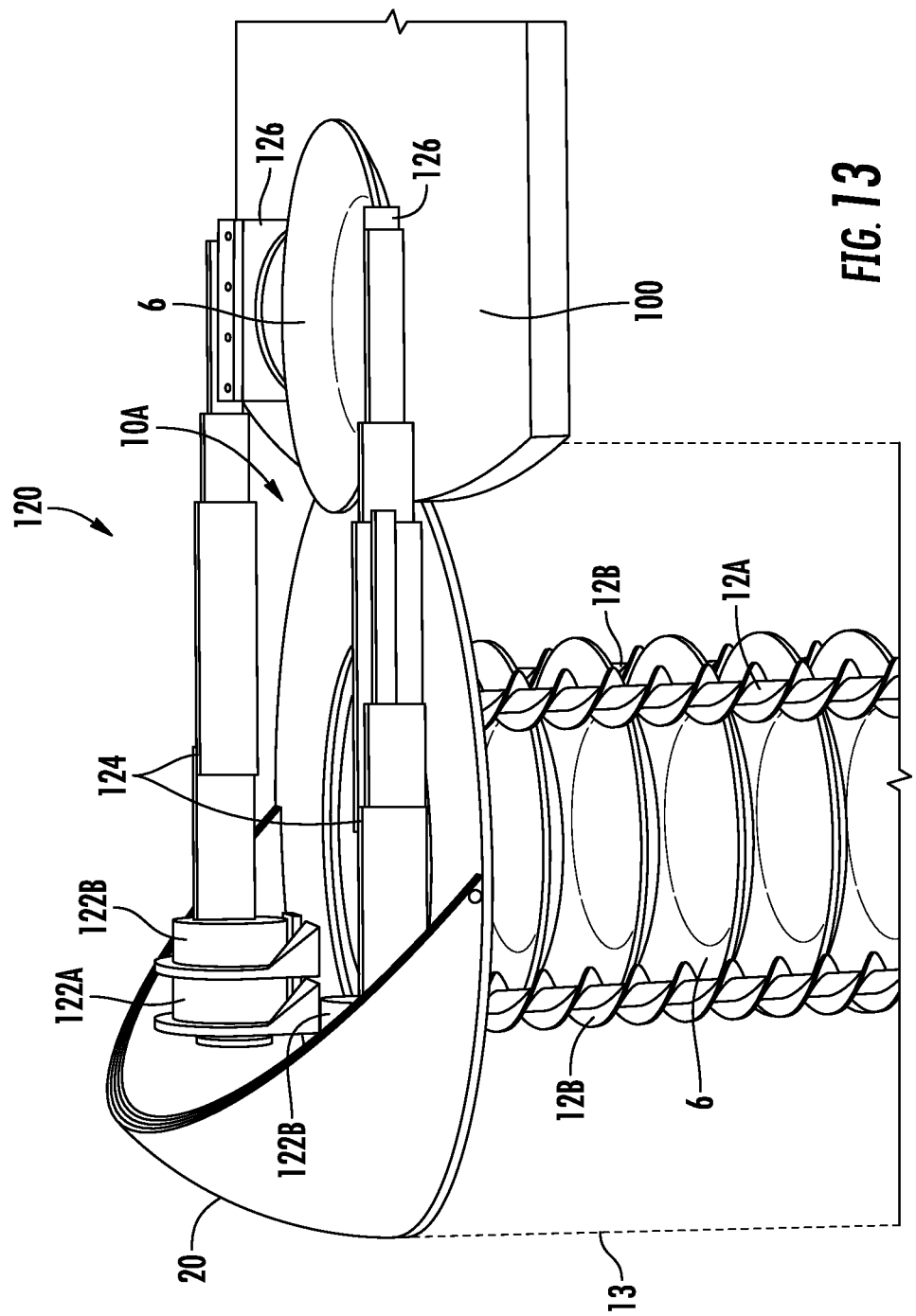

In FIG. 10, the delivery arms 124 are retracted and the fingers 126 are rotated away from the plate 6, allowing the plate 6 to be moved into the staging area. Once in the staging area, the delivery arms 124 are rotated by the second movement mechanism 122B to lift the plate 6 by the fingers 126 to a position above the staging area as shown in FIG. 11. Now the first movement mechanism 122A is operated to extend the arms 124 and relocate the plate 6 forward, and away from the staging area until the plate 6 is over the surface 100 where the plate 6 is to be placed. Once at the surface 100 where the plate 6 is to be placed, the second movement mechanism 122B is operated in an opposite direction to release the plate 6 at the surface.

Now the arms 124 are retracted and the integrated delivery mechanism 10A for acceptance and delivery of plates 6 is relocated by a relocation mechanism 2 (e.g., by motor operated wheels, tracks, etc.) to the next location of the surface 100 where the next plate is to be placed and the above steps are repeated until all plates 6 are placed. Note that any relocation mechanism 2 is anticipated including motor operated wheels (one motor or two motors for providing rotation), tracks, etc. It is also anticipated to have position and navigation sensors such as GPS 89, ultrasonic distance measuring devices for detecting distance to objects such as walls, bumper switches to detect contact with objects, cameras 11, inertial sensors to detect contact with objects, etc.

Figure 14A:
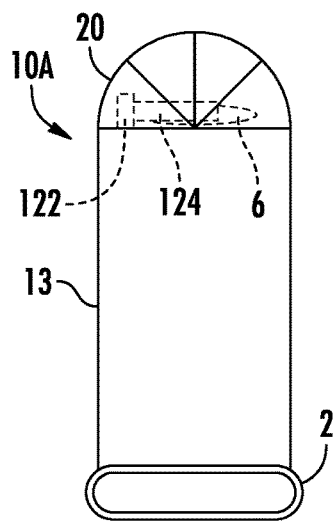
FIGS. 14A, 14B, 14C, 14D, 14E, and 14F illustrate schematic views of the alternate mechanism for acceptance and delivery of plates (e.g., plates having food thereon) having an extending arm for placement of the plates on a surface in operation.
Figure 14B:
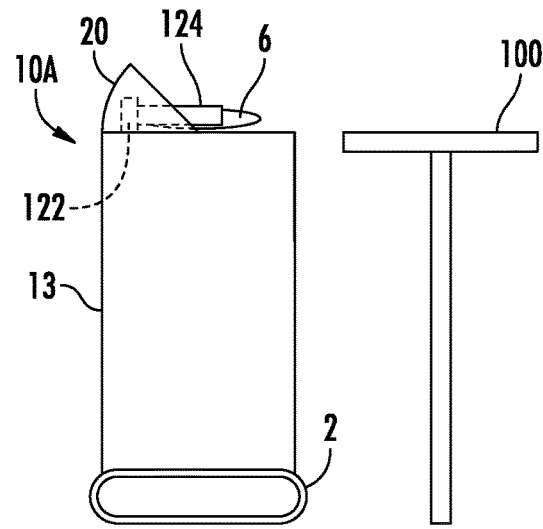
Figure 14C:
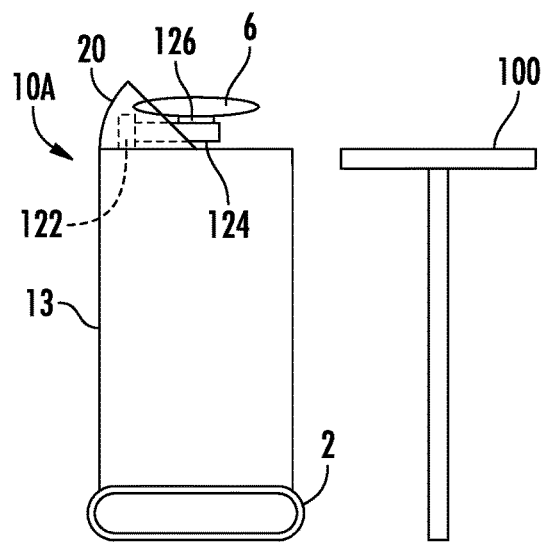
Figure 14D:
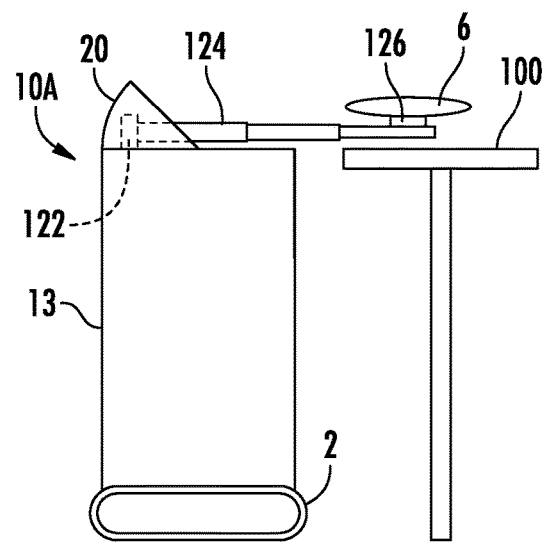
Figure 14E:
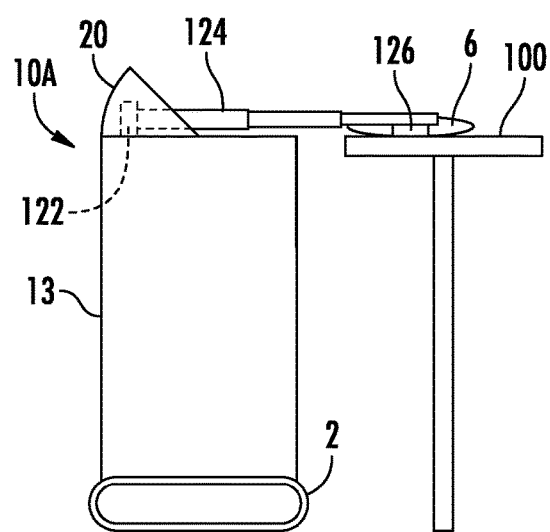
Figure 14F:
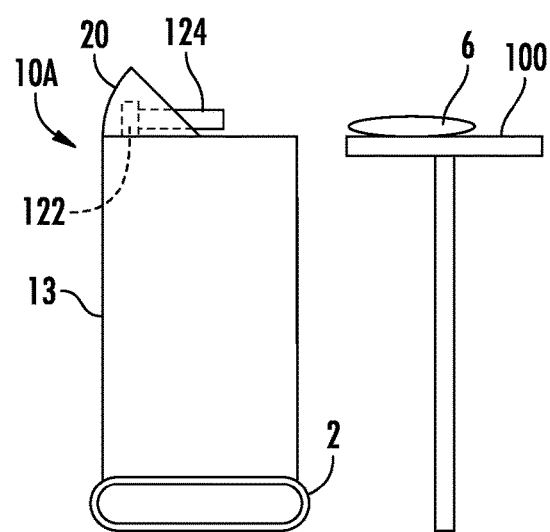

Referring to FIGS. 14A, 14B, 14C, 14D, 14E, and 14F, schematic views of the integrated delivery mechanism 10A for acceptance and delivery of plates 6 (e.g., plates having food thereon) is shown in operation. In FIG. 14A, the integrated delivery mechanism 10A is shown loaded with plates 6 (only a plate 6 at the staging area is visible) and moves by relocation mechanism 2 to the surface 100 where the plate 6 is to be placed. In FIG. 14B, the cover 20 is retracted, exposing the plate 6 at the staging area. In FIG. 14C, the arms 124 are rotated, causing the fingers 126 (not visible) to lift the plate 6. In FIG. 14D, the arms 124 are extending, moving the plate 6 over the surface 100. In FIG. 14E, the arms 124 are rotated in the opposite direction of rotation, dropping the plate 6 onto the surface. Finally, in FIG. 14F, the arms 124 are retracted and the integrated delivery mechanism 10A is ready to stage another plate 6 and relocate to another location on the surface 100 or to a surface 100 that is different (e.g., another table).

Referring to FIG. 15, a control system 60 for the delivery mechanism 10 for acceptance and delivery of plates 6 is shown. The example control system 60 represents a typical system used for controlling the delivery mechanism 10. This exemplary control system 60 is shown in its simplest form. Different architectures are known that accomplish similar results in a similar fashion and the present invention is not limited in any way to any particular control system 60 architecture or implementation. In this exemplary control system 60, a processor 70 executes or runs programs in a random-access memory 75. The programs are generally stored within a persistent memory 74 and loaded into the random-access memory 75 when needed. The processor 70 is any processor, typically a processor designed for control operations. The persistent memory 74 and random-access memory 75 are connected to the processor for example, by a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, magnetic memory, flash memory, read only memory, battery-backed memory, etc. In some embodiments, the persistent memory 74 is removable, in the form of a memory card of appropriate format such as SD (secure digital) cards, micro-SD cards, compact flash, etc.

Also connected to the processor 70 is a system bus 82 for connecting to peripheral subsystems such as a graphics adapter 84 and a touch screen interface 89. The graphics adapter 84 receives commands from the processor 70 and controls what is depicted on a display 86. The touch screen interface 89 provides navigation and selection features. In some embodiments, illuminating devices (e.g., LEDs) are provided instead of or in addition to the display 86.

In general, some portion of the persistent memory 74 is used to store programs, executable code, and data, etc.

The peripherals are examples and other devices are known in the industry such as a Global Positioning Subsystem 91, speakers, microphones, USB interfaces, Bluetooth transceiver 93, Wi-Fi transceiver 96, sensors 11 (e.g., a camera), other sensors 11A, motors 14A/14B, temperature control 16, the cover motor 22, etc.

For local communications, in some embodiments, the control system 60 includes a Bluetooth transceiver 93, a Wi-Fi transceiver 96, or both. In such embodiments, local communications provide data communications between the control system 60 (e.g., the delivery mechanism 10) and other computer-based devices such as the robots 90 or a central control computer for monitoring delivery progress, scheduling, etc.

Figure 16:
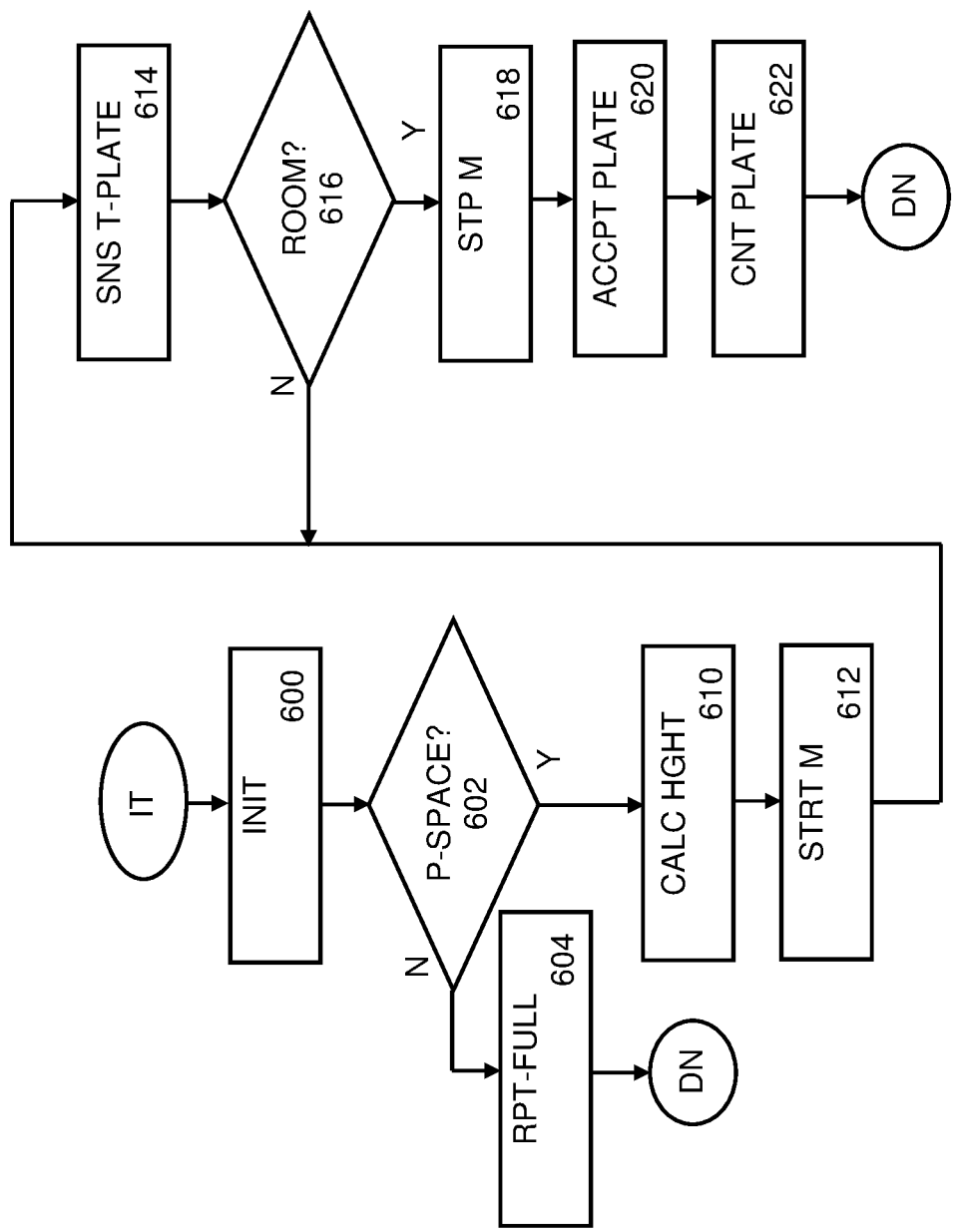
FIG. 16 illustrates a flow chart of an intake operation of the control system for the plate delivery mechanism.

Referring to FIG. 16, a flow chart of an intake operation of the control system 60 for the delivery mechanism 10 is shown.

After initialization 600, a test 602 is made to verify that there is space for a new plate 6. If the test 602 determines that there is no space for the new plate 6, a full status is reported 604 and no plate 6 is accepted.

If the test 602 determines that there is space for the new plate 6, a plate-height calculation 610 is made (e.g., by a pre-set height that is administered or by using the sensors 11 to determine how high is the plate 6 with food on the plate 6. Now, the motor(s) 14A/14B are started 612 to operate in a direction to provide room for the new plate 6 and the location of the top plate 6 is sensed 614 (e.g., using sensors 11/11A) and a plate location test 616 is performed. If the plate location test 616 indicates that the top plate 6 has not moved far enough to accept the new plate 6 without the another plate 6 contacting the food that is on the top plate 6, the top plate 6 is again sensed 614 (e.g., using sensors 11/11A) and the plate location test 616 is again performed (motor(s) 14A/14B are still running) until the plate location test 616 indicates that there is enough room to accommodate the new plate 6, at which time the motor(s) 14A/14B are stopped 618 and the new plate 6 is accepted 620 at the staging area. In some embodiments, a plate count is updated 622, providing data to the processor as to how many plated 6 are stored in the delivery mechanism 10.

Figure 17:
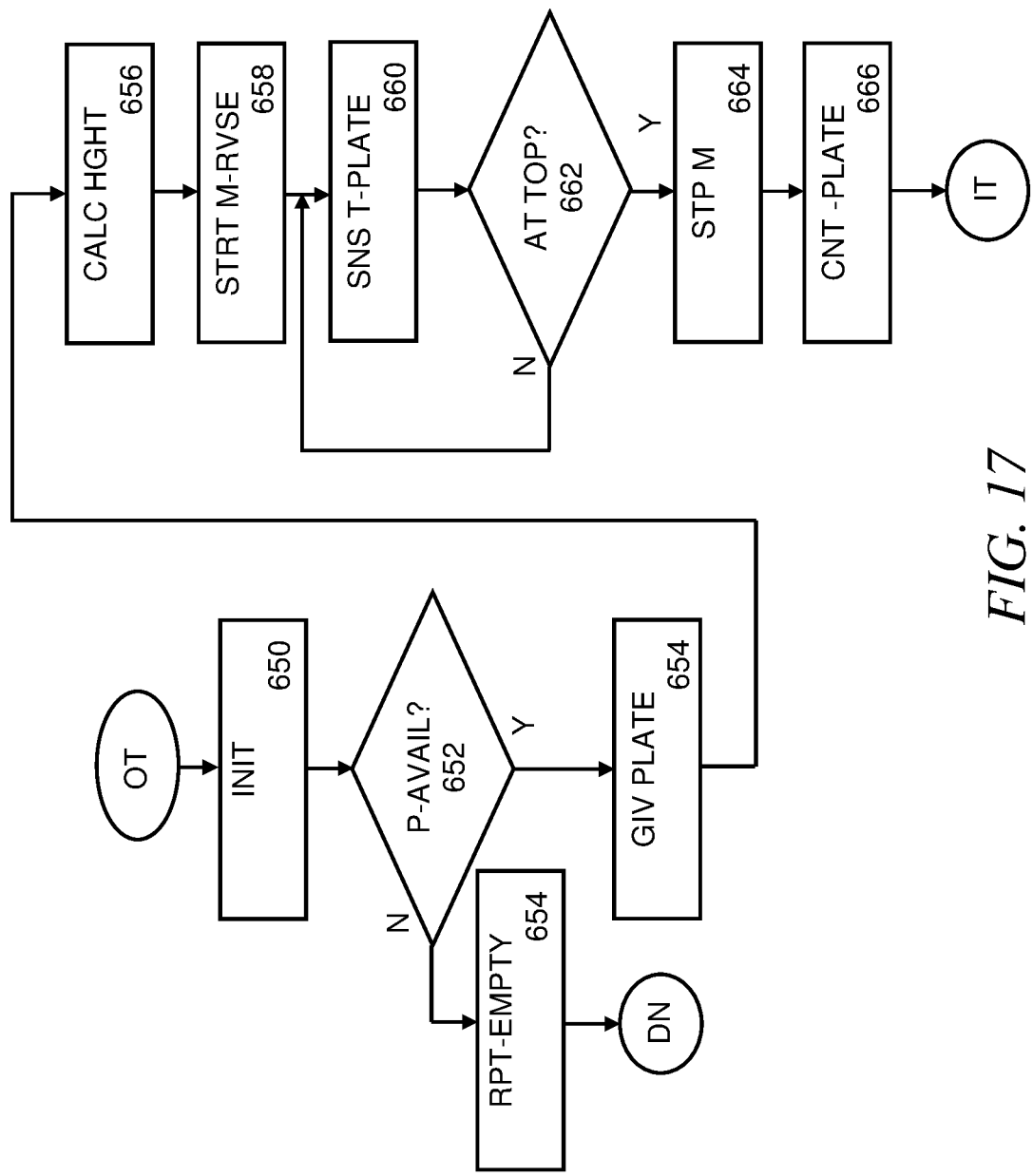
FIG. 17 illustrates a flow chart of an outtake (delivery) operation of the control system for the plate delivery mechanism.

Referring to FIG. 17, a flow chart of an outtake (delivery) operation of the control system 60 for the delivery mechanism 10 is shown. After initialization 650, a test 652 is made to verify that there is a plate 6 in the staging area. If the test 652 determines that there is no plate 6 in the staging area (e.g., the plate count is zero, so no plates 6 are present), an empty status is reported 654 and no plate 6 is available for outtake.

If the test 652 determines that there is a plate 6, the plate 6 at the staging area is taken (e.g., by the robot 90) and a plate-height calculation 656 is made (e.g., by a pre-set height that is administered or by using the sensors 11 to determine how high is the plate 6 with food on the plate 6. Now, the motor(s) 14A/14B are started 658 to operate in a direction (e.g., reverse of that in FIG. 9) to provide the next plate 6 and the location of the next plate 6 is sensed 660 (e.g., using sensors 11/11A) and a plate location test 662 is performed. If the plate location test 662 indicates that the top plate 6 has not moved to the staging area, the top plate 6 is again sensed 660 (e.g., using sensors 11/11A) and the plate location test 662 is again performed (motor(s) 14A/14B are still running) until the plate location test 662 indicates that the top plate is in the staging area, at which time the motor(s) 14A/14B are stopped 664 and the top plate 6 is ready for delivery (e.g., delivery to the robot 90). In some embodiments, a plate count is updated 666, providing data to the processor 70 as to how many plated 6 remain stored in the delivery mechanism 10.

Figure 18:
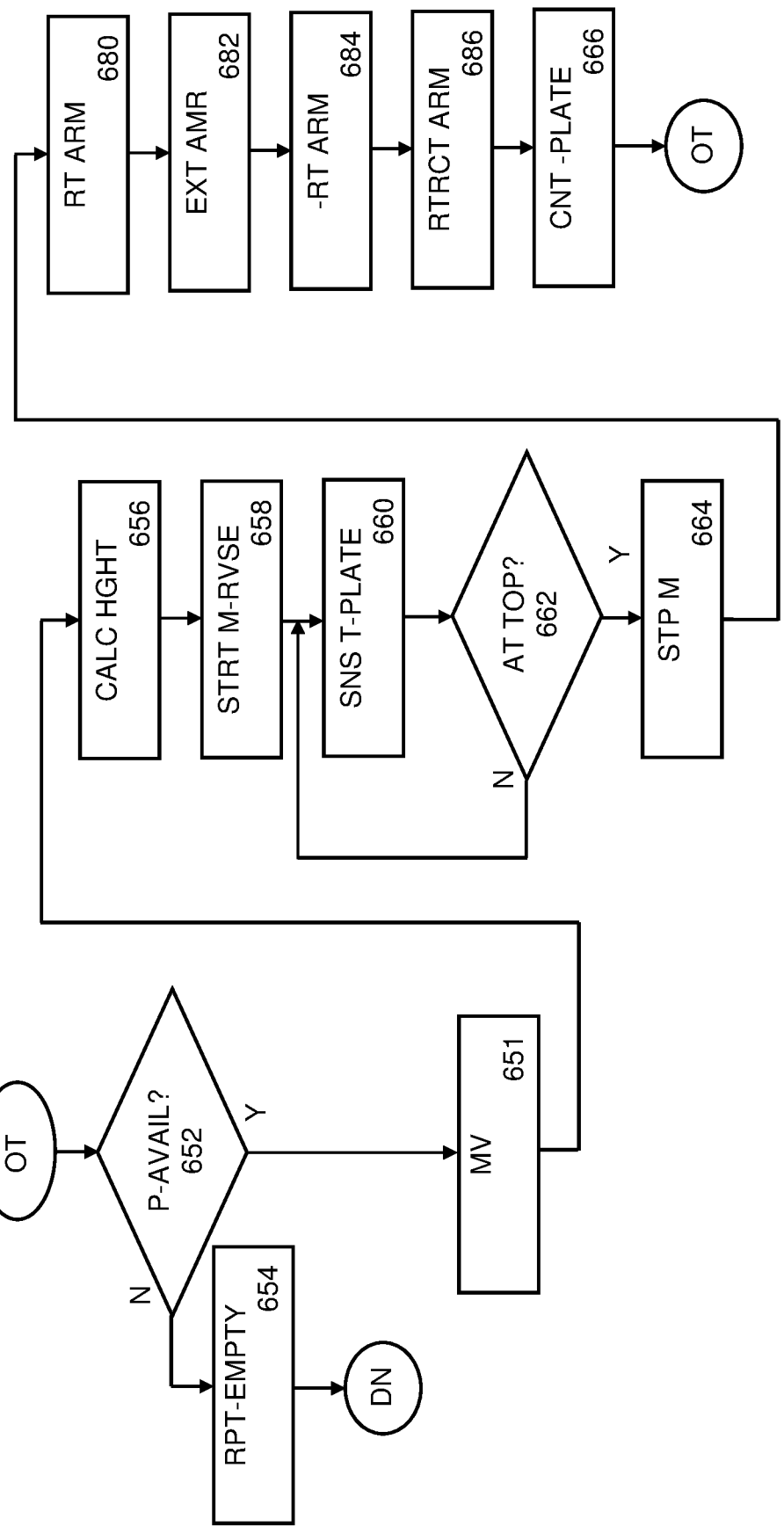
FIG. 18 illustrates a flow chart of an outtake (delivery) operation of the control system for the plate delivery mechanism.

Referring to FIG. 18, a flow chart of an outtake (delivery) operation of the control system 60 for the integrated delivery mechanism 10A is shown. A test 652 is made by the processor 70 to verify that there is a plate 6 ready. If the test 652 determines that there is no plate 6 ready (e.g., the plate count is zero, so no plates 6 are present), an empty status is reported 654 and no plate 6 is available for outtake.

If the test 652 determines that there is a plate 6, the integrated delivery mechanism 10A is moved 651 to the location of the surface 100 at which the plate 6 is to be delivered (e.g., using the Global Positioning Subsystem 91 and the relocation mechanism 2).

Once at the location of the surface 100, a plate-height calculation 656 is made (e.g., by a pre-set height that is administered or by using the sensors 11 to determine how high is the plate 6 with food on the plate 6. Now, the motor(s) 14A/14B are started 658 to operate in a direction (e.g., reverse of that in FIG. 9) to provide the next plate 6 and the location of the next plate 6 is sensed 660 (e.g., using sensors 11/11A) and a plate location test 662 is performed. If the plate location test 662 indicates that the top plate 6 has not moved to the staging area, the top plate 6 is again sensed 660 (e.g., using sensors 11/11A) and the plate location test 662 is again performed (motor(s) 14A/14B are still running) until the plate location test 662 indicates that the top plate is in the staging area, at which time the motor(s) 14A/14B are stopped 664 and the top plate 6 is ready for delivery.

Now, the delivery arms 124 are rotated 680 and the fingers 126 lift the plate 6 from the staging area. Once the plate is lifted, the delivery arms 124 are extended 682 to relocate the plate 6 to a position on the surface 100 where the plate 6 is to be placed and the delivery arms 124 are rotated 684 in an opposite direction of rotation to deposit the plate 6 on the surface. After the plate 6 is deposited on the surface 100, the delivery arm 124 is retracted 686 and ready for a next plate 6.

In some embodiments, a plate count is updated 666, providing data to the processor 70 as to how many plated 6 remain stored in the delivery mechanism 10.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for acceptance and delivery of plates, the system comprising:
 a staging area into which the plates are accepted or delivered;
 spiral shafts configured to move the plates into and out of the staging area by a distance defined by a height of the plates and contents of the plates;
 whereas the spiral shafts are interfaced to a motor, the motor rotating the spiral shafts in one set of directions to move the plates into the staging area for delivery and the motor rotating the spiral shafts in a second set of directions to move the plates from the staging area for acceptance of the plates; and
 whereas an edge of each of the plates rest directly on spirals of each of the spiral shafts.

2. The system of claim 1, wherein the spiral shafts of a first subset of the spiral shafts are wound in one direction of rotations and the spiral shafts of a second subset of the spiral shafts are wound in a direction opposite to the one direction, whereas in the one set of directions, the motor rotates the first subset of the spiral shafts in a clockwise rotation and the motor rotates the second subset of the spiral shafts in a counter-clockwise rotation; and whereas in the second set of directions, the motor rotates the first subset of the spiral shafts in the counter-clockwise rotation and the motor rotates the second subset of the spiral shafts in the clockwise rotation, thereby reducing turning of the plates.

3. The system of claim 1, wherein the motor is a single motor that is mechanically interfaced to each of the spiral shafts.

4. The system of claim 1, wherein each of the spiral shafts has an independent motor.

5. The system of claim 1, wherein the contents of the plates is food.

6. The system of claim 1, further comprising an enclosure having a lid, the lid covering/exposing the staging area.

7. The system of claim 6, further comprising a heater/chiller for keeping the plates and the contents hot/cold.

8. The system of claim 1, further comprising a processor, software stored in a non-transitory memory of the processor, the software controls the processor to control the motor to rotate the spiral shafts to move the plates by the distance.

9. The system of claim 8, wherein the software controls the processor to read one or more sensors that sense locations of the plate, thereby determining when the plates have moved by the distance.

10. The system of claim 1, further comprising delivery arms, each delivery arm having fingers, the delivery arms configured to rotate for lifting and placing plates by the fingers and the delivery arms configured to extend for delivery of the plate onto a surface and the delivery arms configured to retract.

11. A method of accepting and delivering plates from/to a staging area, the method comprising:
when accepting the plates, receiving the plates in spirals of spiral shafts at the staging area and rotating the spiral shafts in a first rotational direction to move the plates from the staging area into a storage positions; and
when delivering the plates, rotating the spiral shafts in a second, opposing rotational direction to move the plates from the storage positions to the staging area for removal of the plates from the staging area.

12. The method of claim 11, further comprising a motor for rotating the spiral shafts.

13. The method of claim 12, wherein the spiral shafts of a first subset of the spiral shafts are wound in one direction of rotations and the spiral shafts of a second subset of the spiral shafts are wound in a direction opposite to the one direction, whereas in the first rotational direction, the motor rotating the first subset of the spiral shafts in a clockwise direction and the motor rotates the second subset of the spiral shafts in a counter-clockwise direction; and whereas in the second, opposing rotational direction, the motor rotating the first subset of the spiral shafts in the counter-clockwise direction and the motor rotates the second subset of the spiral shafts in the clockwise direction, thereby reducing turning of the plates.

14. The method of claim 11, wherein rotating the spiral shafts in the first rotational direction moves the plates from the staging area into a storage position, and rotating the spiral shafts in the second, opposing rotational direction moves the plates a distance of a height of the plates plus any food that is on the plates.

15. The method of claim 11, further comprising:
when delivering the plates, after rotating the spiral shafts in the second, opposing rotational direction to move one of the plates from the storage positions to the staging area, rotating delivery arms to lift the plate from the staging area by fingers affixed to the delivery arms, extending the delivery arms for delivery of the plate, then rotating the delivery arms to release the plate.

16. A system for acceptance and delivery of plates, the system comprising:
a staging area into which the plates are accepted or delivered; and
spiral shafts, the spiral shafts interfaced to a motor, the spiral shafts spaced to interface directly with an outer edge of the plates, the motor rotating the spiral shafts in one set of directions to move the plates into the staging area for delivery and the motor rotating the spiral shafts in a second set of directions to move the plates from the staging area for acceptance of the plates, the plates are moved into and out of the staging area by a distance defined by a height of the plates and contents of the plates by rotating of the spiral shafts.

17. The system of claim 16, wherein the spiral shafts of a first subset of the spiral shafts are wound in one direction of rotation and the spiral shafts of a second subset of the spiral shafts are wound in a direction opposite to the one direction, whereas in the one set of directions, the motor rotates the first subset of the spiral shafts clockwise and the motor rotates the second subset of the spiral shafts counter-clockwise; and whereas in the second set of directions, the motor rotates the first subset of the spiral shafts counter-clockwise and the motor rotates the second subset of the spiral shafts clockwise, thereby reducing turning of the plates.

18. The system of claim 17, wherein the motor is a single motor that is mechanically interfaced to each of the spiral shafts.

19. The system of claim 16, further comprising delivery arms having fingers that are rotated to lift the plate from the staging area by the fingers and the delivery arms having mechanisms to extend the plate, where the delivery arms are rotated to release the plate.

* * * * *